April 15, 1941.  H. T. RITTER  2,238,132
FLOWERPOT
Filed Feb. 15, 1939
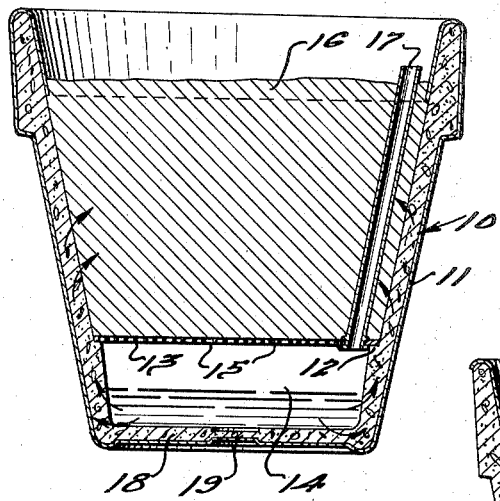
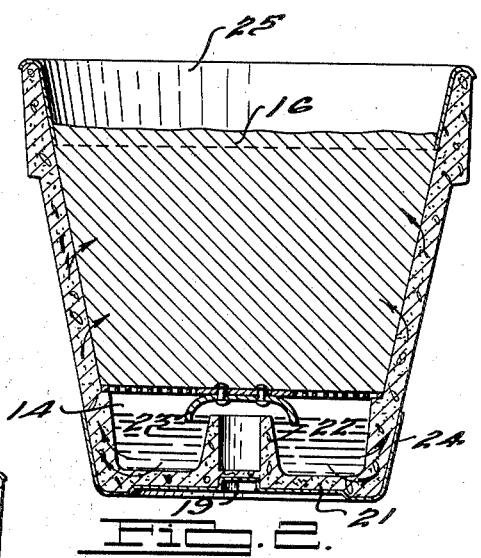
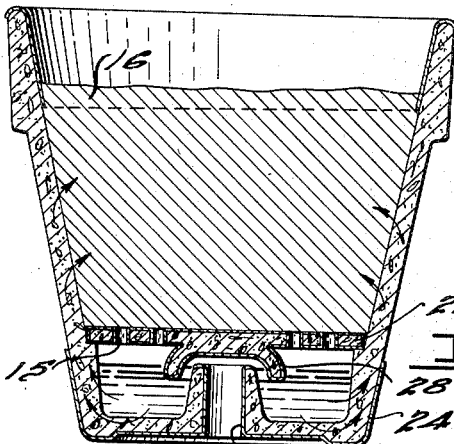
INVENTOR
Henry T. Ritter
BY Harness, Dickey & Pierce
ATTORNEYS.

Patented Apr. 15, 1941

2,238,132

UNITED STATES PATENT OFFICE 2,238,132

FLOWERPOT

Henry T. Ritter, South Rockwood, Mich.

Application February 15, 1939, Serial No. 256,541

5 Claims. (Cl. 47—38)

My invention relates to containers, and particularly to a flowerpot in which plants are to be grown, and is a continuation in part of my co-pending application, Serial No. 197,889, filed March 24, 1938.

While pots for growing flowers, plants, and the like, have been constructed heretofore, having unglazed areas on the inside and glazed areas on the outside with a reservoir below a perforated bottom, my invention embodies an improvement over such construction which provides particular advantages in producing the proper growth of such flowers, plants, and the like. I employ a removable bottom, made of metal, having perforations therein through which the water, poured upon the soil within the pot, may drip into the reservoir.

The wall of the reservoir and the portion in contact with the soil is unglazed and function, through capillary attraction, to draw the water from the reservoir and provide a proper amount of moisture to the contacting surface of the soil. It is well known that the roots of the plants spread to the side walls of the container and grow along its surface. It is evident, therefore, that moisture provided in the wall may produce the proper degree of moisture to such roots.

Accordingly, the main objects of my invention are: to provide a container with an unglazed inner surface and a removable perforated bottom made of metal; to provide a pot with a reservoir below a removable bottom which has attached thereto a conduit to permit water to be poured into the reservoir without passing through the soil; to provide a reduced wall thickness over a small area of the container which may be removed to form a drain; to provide a hollow cylindrical drain projection from the bottom of the pot which regulates the height of the accumulated water therein; to provide a bell over the cylindrical projection to prevent the floating particles from being passed on through the opening therein and to seal the reservoir against the ingress of air; to provide a pot having the outer surface impervious to the passage of moisture at least in the reservoir portion thereof, while the interior is pervious to moisture passage, and, in general, to provide a plant growing container which is simple in construction and which may be used in a variety of manners.

Other objects and features of novelty of my invention will be either specifically pointed out or will become apparent when referring, for a better understanding of my invention, to the following description taken in conjunction with the accompanying drawing, wherein:

Figure 1 is a sectional view of a container with soil therein, embodying features of my invention;

Fig. 2 is a view of structure, similar to that illustrated in Fig. 1, showing a modified form thereof; and Fig. 3 is a view of structure similar to that illustrated in Fig. 2, showing a further form which my invention may assume.

In Fig. 1, I have illustrated a container 10, the walls of which are made up of clay or other well known ceramic material or mixture which has been baked in the usual commercial manner. The outer surface 11 of the pot may be glazed, painted, or otherwise water-proofed in any commercial and well-known manner. The water-proof surface 11 extends down upon the inner surface of the pot a short distance as clearly illustrated in the figure. Near the bottom of the pot a ledge or shoulder 12 is provided on the inner surface upon which a removable bottom 13 rests to form a chamber or reservoir 14 at the bottom of the container. A plurality of apertures 15 are provided in the bottom 13 through which the water, poured upon the earth 16 within the pot or container, may pass through into the chamber or reservoir 14. The water within the reservoir soaks into the wall and is drawn upwardly along the side walls of the pot by capillary attraction to moisten the soil 16 within the pot. The false bottom 13 is preferably made of metal so that the bottom portion of the soil 16 may be retained comparatively dry, thereby providing a continuous circulation of the water through the side walls, the soil 16, and back into the reservoir 14, providing the proper amount of moisture to the roots of the plant being grown within the soil. A tube or conduit 17 is illustrated projecting from the top of the earth having the lower end secured to the bottom 13 so that water may be poured therein without passing through the soil and the pressure within the reservoir equalized.

The bottom 18 of the pot is provided with an area having a thin wall 19 which may be readily broken from the bottom to form a direct drain when the pot is to be used without the reservoir feature. When the wall 19 is so removed, the pot will function as the commercial type of pot now being employed having a hole disposed in its bottom.

It will be noted hereinabove that it was stated that the ceramic pot may be coated or otherwise water-proofed to form a water containing reservoir. It is to be understood that the majority of the pots having the reduced wall 19 are not so water-proofed and the reduced wall thickness provides an increased drainage over that through the wall but less drainage than when the wall portion 19 is removed. In nurturing a seed more moisture may be required during the germination period and less moisture required after the roots have progressed a material amount at which time the reduced wall thickness 19 may be removed without disturbing the earth or plant within the pot.

In Figure 2, a similar pot or container is illustrated having in the bottom 21 thereof a hollow cylindrical projection 22 having a thin wall which, when retained within the cylindrical projection 22, provides a pot which functions in the manner as that above specified with regard to the pot illustrated in Fig. 1. The wall 19, however, may be removed so that the cylindrical projection 22 functions as an overflow drain to prevent too great an accumulation of water within the reservoir. A bell 23 may be employed relative to the top of the overflow projection 22 to prevent floating particles in the water from passing out through the drain, and to provide a seal against the passage of air into the reservoir.

In Figs. 2 and 3, it will be noted that the outer coated surface 24 is provided only adjacent to the reservoir so that the sides of the pot are pervious to the passage of moisture. A similar coated surface 25 may be provided at the top of the pot above the soil to force the water poured upon the soil to pass therethrough. The pot functions in the same manner as that of Fig. 1 and in addition may be employed as a humidifier to have some of the moisture within the container pass from the walls thereof into the surrounding atmosphere.

In Fig. 3, I have shown a container similar to that illustrated in Fig. 2, with the wall 19 of the overflow projection 22 omitted and wall 26 of the hollow interior waterproofed. The false bottom 27 is illustrated as being made of ceramic material with a bell 28 molded directly thereon. The bottom 27 and bell 28 have their entire surface glazed, painted, or otherwise coated against the passage of moisture. Suitable openings 15 are provided in the bottom 27 while the bell provides a seal against the passage of air into the reservoir.

The container is exceedingly novel in that various methods of growing plants may be effected therein. The container may be used in conjunction with the bottom reservoir for water which is drawn upwardly by the wall material and fed to the plant roots. The bottom may be used with a drain to quickly drain off the moisture in the earth at the container sides.

Water may be poured into the reservoir through a hollow tube without passing through the soil and thereafter fed to the roots through the side wall. The depth of water in the reservoir may be regulated by an overflow projection which may be sealed with a bell, while the outer walls may prevent the passage of moisture only through the reservoir portion thereof.

While I have described and illustrated a single embodiment of my invention, it will be apparent to those skilled in the art that various changes, omissions, additions, and substitutions may be made therein without departing from the spirit and scope of my invention, as set forth in the accompanying claims.

What I claim is:

1. A container made of ceramic material having the inner surface of the wall pervious to moisture, and a partition in said container impervious to moisture and having apertures therein, said partition forming a reservoir in the bottom of said container, a portion of said ceramic material of the container being reduced in thickness to permit the passage of moisture more readily therethrough and to be readily removable to form an aperture.

2. A flowerpot made of ceramic material having the sides and bottom of predetermined thickness, said container having an area of reduced thickness to permit the passage of moisture more readily therethrough and which may be removed to form an aperture.

3. A flowerpot made of ceramic material having the inner surface of the wall pervious to moisture, a metal partition in said container having apertures therein spaced from the bottom thereof, the bottom of said container having an overflow projection therein spaced from said partition to regulate the height of the water collected in the bottom of said container, said overflow projection being closed by a wall of reduced thickness to permit the drainage of moisture more readily therethrough and which may be removed to form an aperture and a direct drain.

4. A container made of ceramic material having the inner surface of the wall pervious to moisture, a metal partition in said container having apertures therein spaced from the bottom thereof, the bottom of said container having an overflow projection therein spaced from said partition to regulate the height of the water collected in the bottom of said container, and a bell on the partition extending over the top of the overflow projection to form a seal.

5. A container made of ceramic material having the surface of the inner and outer walls pervious to moisture opposite to the soil carrying portion thereof, a partition impervious to moisture in the bottom of the container having a plurality of apertures, said partition forming a reservoir therebelow, the outer surface of the container adjacent to said reservoir being impervious to moisture providing a flow of moisture from the reservoir to the side of the container and from the side to the soil therewithin and to the air surrounding the container.

HENRY T. RITTER.